UNITED STATES PATENT OFFICE.

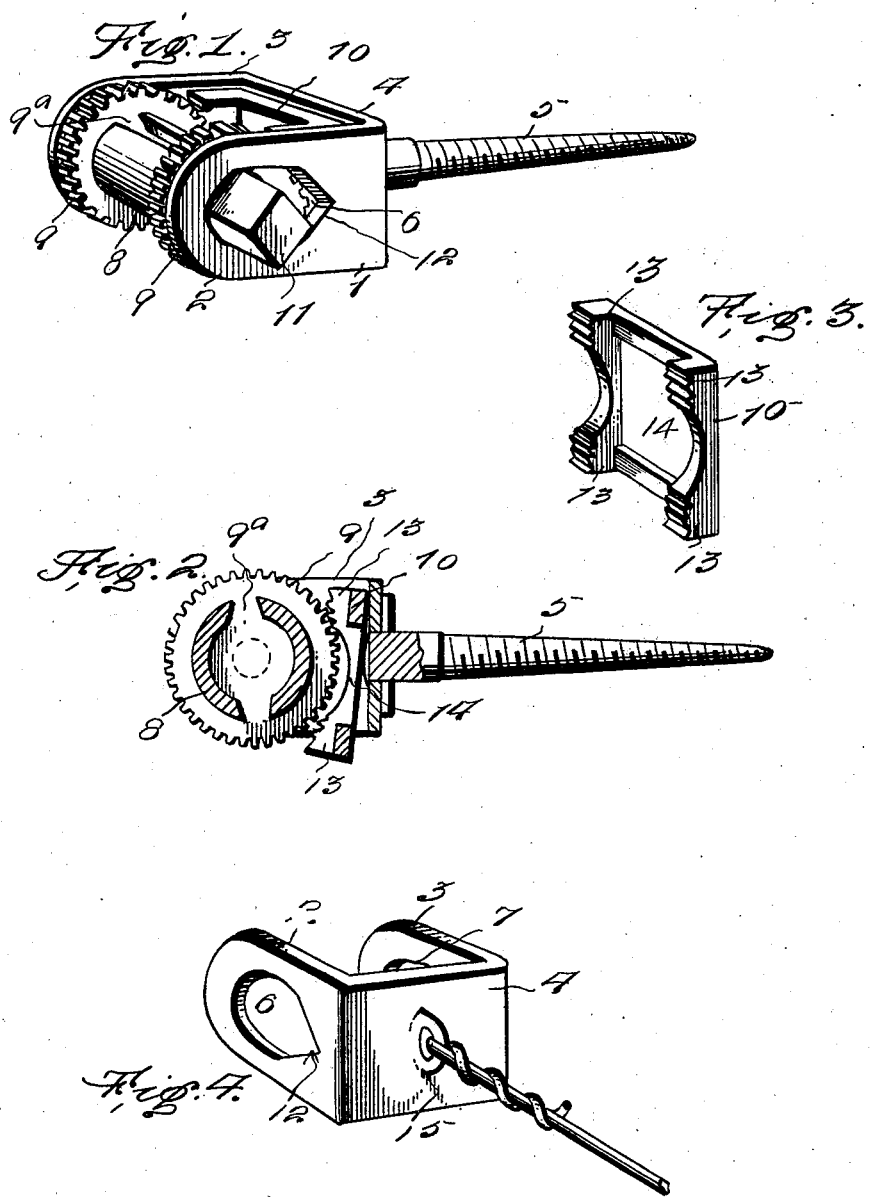

OREN ANDREW, OF TOWNSEND, NEW YORK, ASSIGNOR OF ONE-HALF TO BARNET ANDREW AND CHARLES H. LOCKWOOD, OF MONTEREY, NEW YORK.

WIRE-STRETCHER.

SPECIFICATION forming part of Letters Patent No. 711,651, dated October 21, 1902.

Application filed January 15, 1902. Serial No. 89,884. (No model.)

*To all whom it may concern:*

Be it known that I, OREN ANDREW, a citizen of the United States, residing at Townsend, in the county of Schuyler and State of New York, have invented a new and useful Wire-Stretcher, of which the following is a specification.

The invention relates to improvements in wire-stretchers.

The object of the present invention is to improve the construction of wire-stretchers and to provide a simple, inexpensive, and efficient one adapted to be readily applied to a post, building, tree, or other anchor or support and capable of being readily reversed to enable it to be operated at either side.

A further object of the invention is to provide a device of this character which may be rigidly fixed in position and which will not require any rearrangement of the parts when it is desired to reverse it.

The invention also has for its object to provide a device of this character which will be capable of stretching various wires other than fence-wires and which will also be adapted for use as a mid-wire take-up.

The invention consists in the construction and novel combination and arrangement of parts hereinafter fully described, illustrated in the accompanying drawings, and pointed out in the claim hereto appended.

In the drawings, Figure 1 is a perspective view of a wire-stretcher constructed in accordance with this invention. Fig. 2 is a longitudinal sectional view. Fig. 3 is a detail perspective view of the gravity pawl or detent. Fig. 4 is a detail perspective view of a bearing-frame provided with an eye for adapting the device to be used as a mid-wire take-up.

Like numerals of reference designate corresponding parts in all the figures of the drawings.

1 designates a bearing bracket or frame composed of sides 2 and 3 and a back 4, connecting the sides and designed to be provided with a screw 5 or other suitable means for securing it to a post or other anchor or for attaching it to a wire. The screw, which is preferably tapered, as illustrated in Figs. 1 and 2, may be constructed separate from the bearing-bracket and is suitably fixed to the same, or it may be formed integral therewith. The sides 2 and 3 are provided with bearing-openings 6 and 7, receiving a shaft or drum 8, having toothed flanges 9, located at the inner faces of the sides 2 and 3 and adapted to be engaged by a gravity detent or pawl 10. The shaft or drum is provided between the flanges with a long slot or opening $9^a$, adapted to receive an ordinary wire or a strip or ribbon, and the ends of the shaft or drum are arranged in the bearing-openings 6 and 7, and the end 11, which extends beyond the frame or bracket, is squared to receive a crank, wrench, or other tool to enable the shaft or drum to be rotated. The opening 6 is enlarged and is provided with a tapered inner portion 12, adapted when the sides of the frame or bracket are slightly spread to permit the shaft or drum to be swung outward horizontally at an angle to remove it. The tapered portion 12 of the opening 6 is adapted to receive one corner of the squared portion of the shaft, and it will enable the latter to be readily introduced into and removed from the bearing-openings of the frame or bracket.

The gravity detent or pawl 20, which is interposed between the toothed flanges 9 and the back of the frame or bracket, is composed of engaging side portions having upper and lower teeth 13 and an intermediate concave portion 14. The sides of the detent or pawl are suitably connected at the top and bottom and the teeth of the upper and lower portions of the sides are adapted to mesh with the teeth of the flanges 9, whereby the drum or shaft is locked against rotation. The upper and lower engaging portions of the sides of the gravity detent or pawl 10 are enlarged to prevent the pawl from dropping through the spaces between the back of the frame or bracket and the toothed flanges of the shaft or drum. This construction of pawl or detent enables the device to be readily reversed to bring the projecting polygonal portion 11 of the shaft or drum at either side, so that the device may be operated at either side of a fence or post or other support to suit the convenience of the operator.

Instead of employing a screw, as shown in Figs. 1 and 2, the frame may be provided with the eye 15 (illustrated in Fig. 4 of the drawings) to adapt the device for use as a mid-wire take-up. The eye 15 is adapted to receive one portion of a wire, and the other portion is adapted to be connected to the shaft or drum, which may be rotated to stretch the wires to the desired tension.

It will be seen that the device is exceedingly simple and inexpensive in construction, that it is adapted to be readily mounted on a post or other support or on a fence-wire for use as a mid-wire take-up, and that it is capable of being readily reversed to enable it to be operated at either side of a fence, post, or other support or anchor. It will also be seen that the parts do not require any rearrangement when it is desired to reverse the shaft or drum and that as the engaging portions of the pawl or detent are arranged at the ends of the drum or the shaft the latter will be securely held.

What I claim is—

A device of the class described comprising a bearing bracket or frame, a shaft or drum journaled in the bearing bracket or frame and provided at opposite sides with toothed annular flanges and the double gravity detent or pawl interposed between the shaft or drum and the back of the bearing bracket or frame and composed of opposite sides suitably connected and provided with enlarged upper and lower portions, and reduced intermediate portions, the enlarged portions being provided with teeth for engaging the toothed flanges, whereby the device is adapted to be reversed, substantially as and for the purpose described.

In testimony that I claim the foregoing as my own I have hereto affixed my signature in the presence of two witnesses.

OREN ANDREW.

Witnesses:
GEO. C. WAIT,
G. M. STILWELL.